Jan. 17, 1939.  A. BOOT  2,144,284
MANUFACTURE OF SOLES FOR SHOES
Filed June 12, 1935
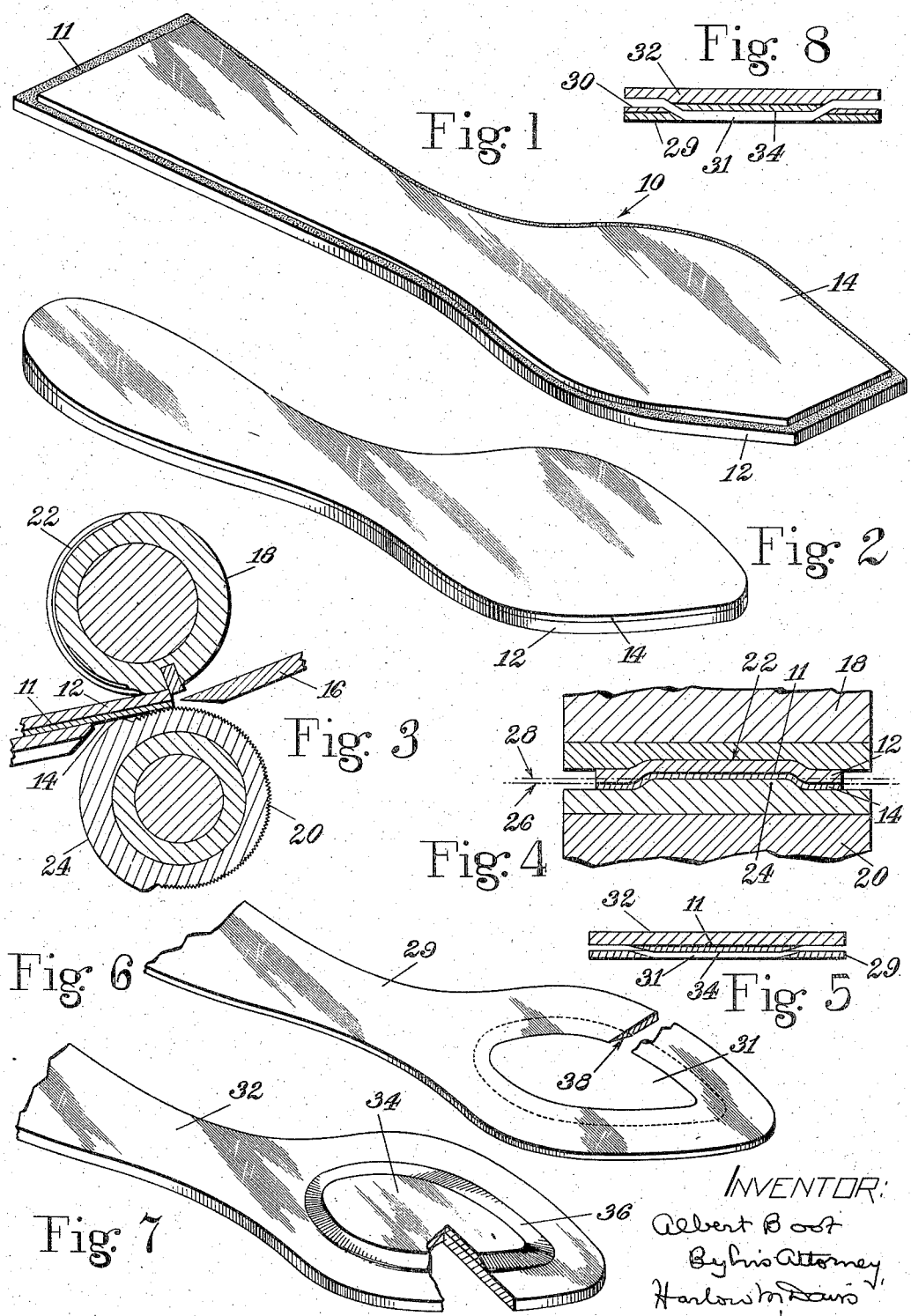

Patented Jan. 17, 1939

2,144,284

UNITED STATES PATENT OFFICE 2,144,284

MANUFACTURE OF SOLES FOR SHOES

Albert Boot, Lynn, Mass., assignor to United Shoe Machinery Corporation, Paterson, N. J., a corporation of New Jersey Application June 12, 1935, Serial No. 26,217

3 Claims. (Cl. 12—146)

This invention relates to the manufacture of soles for shoes and is herein illustrated with reference to the manufacture of insoles and outsoles having complemental forward portions.

In the manufacture of shoes of a well-known type, it is customary to form, from a solid leather sole blank, a so-called "complemental insole-outsole combination" consisting of a skeleton insole having an opening in its forepart and an outsole having a raised portion or projection on its forepart which is substantially complemental to the opening in the insole. This practice necessitates the use of heavy sole leather of a superior quality suitable for the making of an outsole and of a thickness equal to the combined thickness of the outsole and the insole which are to be made therefrom. Sole leather of such quality and thickness is necessarily expensive and is not always readily available and it is among the objects of the present invention to render unnecessary the employment of such heavy and expensive sole leather in the manufacture of insole-outsole combinations of the type referred to and thereby to effect a substantial reduction in the cost of making such combinations.

With this object in view the present invention provides an improved method of making soles which involves securing or joining together, in face-to-face relation, two sole blanks or layers which may be of different materials thereby providing a unitary sole blank of laminated formation, and subsequently dividing said unitary laminated blank into an insole having an opening in its forepart and an outsole having a projecting portion on its forepart which is complemental to the opening in the insole. As herein exemplified, the two sole blanks or layers which are to constitute the laminated blank are secured together by means of suitable adhesive and are shaped substantially to final sole edge contour, as by a rounding or die-cutting operation, such operation being performed preferably, but not necessarily, after the layers have been secured together. As also exemplified herein, the forming of an insole and an outsole from the laminated blank is accomplished by dividing the blank in or near the plane of adhesion or jointure between its component layers, except around the central forward portion of the blank where the blank is cut obliquely to its surface so as to form an undercut opening in the insole layer and a corresponding bevel upon that portion which is separated from the insole layer and remains secured to the outsole layer to constitute the forepart projection upon the outsole. This dividing operation may conveniently be accomplished, as herein illustrated, by means of a matrix roll type splitting machine comprising a single, straight-edged splitting knife and cooperating matrix rolls constructed and arranged to feed a sole blank edgewise to and past the knife and to deform the blank from its normal flat condition before it reaches the knife in such a manner as to control the location of the oblique cuts so that the desired results will be obtained. If desired, the splitting machine may be adjusted so that the dividing operation, instead of proceeding along the plane of adhesion between the component layers of the blank, will extend parallel and close to that plane through the substance of the outsole layer so that the resulting insole will be of laminated construction comprising a thin skiving of outsole material in addition to the layer of insole material, the skiving of outsole material serving to reinforce the insole so that an original layer of insole material may be employed which is of a less superior quality than would otherwise be necessary.

The invention will now be explained with reference to the accompanying drawing, in which Fig. 1 is a perspective view of a laminated sole blank of the type employed in the practice of my improved method;

Fig. 2 is a perspective view of the sole blank as it appears after having been rounded to impart substantially a final sole edge contour thereto;

Fig. 3 is a fragmentary, sectional view illustrating the operation upon the sole blank of a matrix roll splitting machine such as may be employed for dividing the blank into an insole having an opening in its forepart and an outsole having a projecting portion upon its forepart that is complemental to the opening in the insole;

Fig. 4 is a vertical, sectional view of the matrix rolls of the splitting machine illustrating the operation of the rolls upon the forward portion of the sole blank;

Fig. 5 is a cross-sectional view of the forward portions of the insole and the outsole into which the sole blank is divided by the action of the splitting machine, when the relative adjustment of the knife and the work is as shown in Fig. 3, the soles being shown as they appear after the material operated upon has reacted from the deforming pressure exerted thereon by the rolls;

Figs. 6 and 7 are fragmentary perspective views, respectively, of the insole and the outsole produced by the splitting operation; and Fig. 8 is a view similar to Fig. 5 but illustrating the appearance of the work produced when the splitting machine is adjusted so that the knife will cut through the outsole material.

In the practice of my improved method, as herein illustrated, I provide a laminated sole blank 10 by securing two layers of material together by means of a suitable adhesive 11, such as rubber cement or latex. An aqueous dispersion of rubber containing an emulsion of organic solvents has been found to be particularly adapted for use as the adhesive. Preferably the layers which are to constitute the laminated blank are cut to a shape roughly approximating that of a sole as is customary in the manufacture of sole blanks which are subsequently to be shaped substantially to final edge contour by a rounding or die-cutting operation. One of the layers 12 of the laminated blank 10, which may for convenience be termed the outside layer, is preferably composed of relatively tough sole leather of a quality and thickness suitable for the production of an outsole while, as illustrated, the other layer 14, hereinafter referred to as the insole layer, is substantially thinner than the outsole layer 12 and is preferably composed of a less expensive and relatively flexible material, for example, split leather such as that customarily employed in manufacturing insoles, or any of the well-known leather substitutes commonly used in the making of so-called manufactured insoles. The composite or laminated sole blank 10 is next cut substantially to final sole edge contour, for example, by means of a sole rounding machine, after which the blank will appear as shown in Fig. 2. It is to be understood, however, that if desired the insole and outsole layers may be rounded or died out substantially to final sole shape before being assembled and secured together to constitute the laminated blank.

In proceeding with the practice of my method, the laminated sole blank comprising the sole-shaped outsole and insole layers 12 and 14 is submitted to a splitting operation as a result of which the blank is divided into an insole and an outsole. In order to produce, as a result of the splitting operation, an opening in the central forward portion of the insole and a complemental projection upon the corresponding portion of the outsole, the splitting operation may advantageously be performed by means of a machine of the general type of that disclosed in a co-pending application, Serial No. 759,846, filed December 31, 1934, in the name of William D. Thomas. In the use of this machine the forepart of the sole blank is temporarily deformed or distorted by depressing a portion thereof corresponding in shape and location to the shape and location of the opening to be produced in the insole so that the depressed portion will avoid the knife of the splitting machine by means of which the blank is divided. As indicated in Fig. 3, the splitting machine comprises a single, straight-edged splitting knife 16, an adjustable upper matrix roll 18, and a lower feed roll 20, which is yieldingly mounted so as to press the work, that is, the laminated sole blank, toward the upper roll 18. The upper roll 18 has formed therein a cavity 22 shaped to conform in outline to that of the opening to be formed in the forepart of the insole and the roll 20 has formed thereon a projection 24 that is complemental to the recess 22 in the roll 18. The upper roll 22 may be adjusted relatively to the knife 16 so that, as the sole blank is being fed past the knife, the knife will divide the blank substantially in the plane of adhesion between its two component layers except in that portion of the forepart of the blank which is deformed by the cooperative action of the lower roll projection 24 and the upper roll cavity 22. Such an adjustment of the splitting machine is illustrated in Fig. 4, the location of the cutting edge of the knife 16 relatively to the rolls and the work being conventionally indicated by the dotted line 26. In such a case the knife will operate, except where the blank is deformed in its forepart, merely to separate the layers of the blank without actually cutting or splitting the material of either layer. Alternatively, however, the machine may be adjusted so that the knife edge will be located relatively to the work as conventionally indicated by the dotted line 28 in Fig. 4 in which case the knife will cut through the outsole layer close to the plane of adhesion but at a slight distance therefrom so as to split from the blank an insole of laminated formation having a thin skiving 30 of outsole material at one side thereof as shown in Fig. 8. The manner in which the forward portion of the sole blank is temporarily deformed by the action of the matrix rolls is also illustrated in Fig. 4. After the deformed portion of the sole blank has been advanced past the knife 16, and after the blank has had an opportunity to react from the deforming pressure of the rolls, it will appear as shown in Figs. 5 or 8, the blank having been divided into an insole 29 having a central forepart recess 31 and an outsole 32 having a central forepart projection 34 which is complemental to the recess 31. As shown in Figs. 6 and 7, the outsole projection 34 is formed with a beveled marginal portion 36 while the insole recess 31 is defined by a correspondingly beveled wall 38.

If the adjustment of the machine is such that the cutting edge of the knife 16 bears the relation to the work indicated by the dotted line 26 in Fig. 4, the resulting insole-outsole combination will appear as shown in Fig. 5, the insole being composed entirely of the material of the original insole layer and the outsole being composed only of the material of the original outsole layer except in the central portion of the forepart where the projecting portion 34 is composed entirely of insole material.

If, however, the adjustment of the machine is such that the cutting edge of the knife 16 bears the relation to the work indicated by the dotted line 28 in Fig. 4, then the resulting insole-outsole combination will appear as shown in Fig. 8, the insole being of laminated construction having a thin skiving 30 of outsole material secured to the original insole layer. If the machine is to be adjusted so as to produce a laminated insole, such as that shown in Fig. 8, there may be employed, in making the laminated sole blank, an insole layer of less expensive material than would otherwise be necessary, inasmuch as the thin skiving of outsole material which is left attached to the insole after the splitting operation effectively reinforces the insole without, however, stiffening it unduly.

Whether the laminated sole blank is split along the plane of adhesion or at one side thereof, the expense of manufacturing the insole-outsole combination will be substantially less than if it were produced from an integral or solid leather blank. In accordance with the herein-described method, also, insole-outsole combinations may be obtained in much heavier weights than would be possible where a single thickness of sole leather is divided. This method also provides for the making of the insole from regular insole stock or from other material which is softer and more flexible and better adapted for use in making insoles than is the relatively expensive and tough outsole stock and which may be of a quality which is relatively inferior to that of the material of the outsole layer.

The insole-outsole combination produced by the practice of the herein-described method is adapted to be employed in the usual way in the manufacture of a shoe, the insole being assembled with an upper on a last, the upper being lasted and secured to the insole in any suitable manner, and the outsole assembled and secured in proper relation to the insole and upper either by stitching or cementing, depending upon the type of construction desired.

Having described my invention, what I claim as new and desire to secure by Letters Patent of the United States is:

1. That improvement in methods of making soles which comprises securing together in face-to-face relation throughout substantially their entire extent by means of adhesive a blank of flexible insole material and a blank of outsole leather to form a unitary laminated sole blank, passing said laminated blank between a roller having a die shaped to flex the central forepart portion of said blank out of the plane of the remainder of the blank and a second roller having a matrix adapted to receive said flexed sole blank portion, and while said blank is thus flexed between said rollers rotating such rollers and advancing the blank edgewise past a straight-edged knife thereby splitting the blank into an insole comprising said insole material and having an opening in its forepart and an outsole having a main portion comprising said outsole material and having upon its forepart a projecting portion complemental to said insole opening.

2. That improvement in methods of making soles which comprises adhesively securing together a ply of insole material of less thickness than a required insole and a ply of outsole material of greater thickness than a required outsole to form a unitary blank, temporarily flexing the central forepart portion of said blank between die and matrix equipped rollers, and rotating said rollers and advancing said blank past a straight-edged knife while said central forepart portion is held in flexed position between the rollers to form an insole of said required insole thickness having a central opening in its forepart and an outsole generally of said required outsole thickness and having a projecting portion on its forepart complemental to said insole opening.

3. That improvement in methods of making soles which comprises securing together in face-to-face relation by means of adhesive a blank of flexible insole material and a blank of outsole leather to form a unitary laminated sole blank, passing said laminated blank between a roller having a die shaped to flex the central forepart portion of said blank out of the plane of the remainder of the blank and a second roller having a matrix adapted to receive said flexed sole blank portion, and while said blank is thus flexed between said rollers rotating such rollers and advancing the blank edgewise past a straight-edged knife thereby splitting the blank into an insole comprising said insole material and having an opening in its forepart and an outsole having a main portion comprising said outsole material and having upon its forepart a projecting portion complemental to said insole opening.

ALBERT BOOT.